United States Patent [19]

Bacardit

[11] Patent Number: 5,027,927
[45] Date of Patent: Jul. 2, 1991

[54] VARIABLE RATE SHOCK ABSORBER

[75] Inventor: Juan S. Bacardit, Barcelona, Spain

[73] Assignee: Bendix Espana S.A., Barcelona, Spain

[21] Appl. No.: 530,495

[22] Filed: May 29, 1990

Related U.S. Application Data

[63] Continuation of Ser. No. 310,981, Feb. 14, 1989, abandoned.

[30] Foreign Application Priority Data

Feb. 15, 1988 [EP] European Pat. Off. ............ 88500011

[51] Int. Cl.$^5$ .................................................. F16F 9/46
[52] U.S. Cl. ..................................... 188/299; 188/314; 188/319; 188/322.15; 251/122; 280/714
[58] Field of Search ................... 188/299, 319, 322.13, 188/322.14, 322.15, 314, 315; 280/714; 251/120, 121, 122

[56] References Cited

U.S. PATENT DOCUMENTS

| | | | |
|---|---|---|---|
| 1,929,973 | 10/1933 | Haley | 251/122 X |
| 2,007,051 | 7/1935 | Hirvonen | 251/122 |
| 2,485,349 | 10/1949 | Bass | 251/122 X |
| 3,039,566 | 6/1962 | Rumsey | 188/88 |
| 4,682,675 | 7/1987 | Eddy, Jr. | 188/299 |
| 4,696,379 | 9/1987 | Yamamoto et al. | 188/319 X |
| 4,726,453 | 2/1988 | Obstfelder et al. | 188/299 X |

FOREIGN PATENT DOCUMENTS

| | | | |
|---|---|---|---|
| 11363 | 10/1908 | Denmark | 251/122 |
| 0066154 | 12/1982 | European Pat. Off. . | |
| 0122575 | 10/1984 | European Pat. Off. . | |
| 0186167 | 7/1986 | European Pat. Off. . | |
| 3231739 | 3/1984 | Fed. Rep. of Germany . | |
| 29813 | 7/1958 | Finland | 251/122 |
| 57-115468 | 7/1982 | Japan . | |
| 0664770 | 1/1952 | United Kingdom . | |
| 2159604 | 12/1985 | United Kingdom . | |

Primary Examiner—George E. A. Halvosa
Attorney, Agent, or Firm—Larry J. Palguta; Ken C. Decker

[57] ABSTRACT

A variable rate shock absorber comprising a tubular working cylinder (10) destined to be mounted on a suspended part of a vehicle, a piston rod assembly (24) slidably received in the working cylinder (10) and having an end (34) destined to be mounted on a fixed part of a vehicle, the piston rod assembly (24) having at its free end a piston member (48) cooperating with the working cylinder (10) to divide the interior thereof into an upper (44) and a lower working chamber (56), a valve mechanism in the piston member (48) to permit controlled two-way flow between the upper and lower working chambers an electro-magnetic valve mechanism (62) disposed between the upper working chamber (44) and a reservoir (18) and selectively actuatable to allow fluid flow therebetween, the valve mechanism (62) comprising a first member (80, 114) slidably mounted with respect to a second member (72, 116) between a closed position and an open position, characterized in that the first member (80, 114) is movable into at least one partially open position, the position defined by at least one stepped valve surface (94, 100, 126) formed on one member (80, 116).

10 Claims, 4 Drawing Sheets

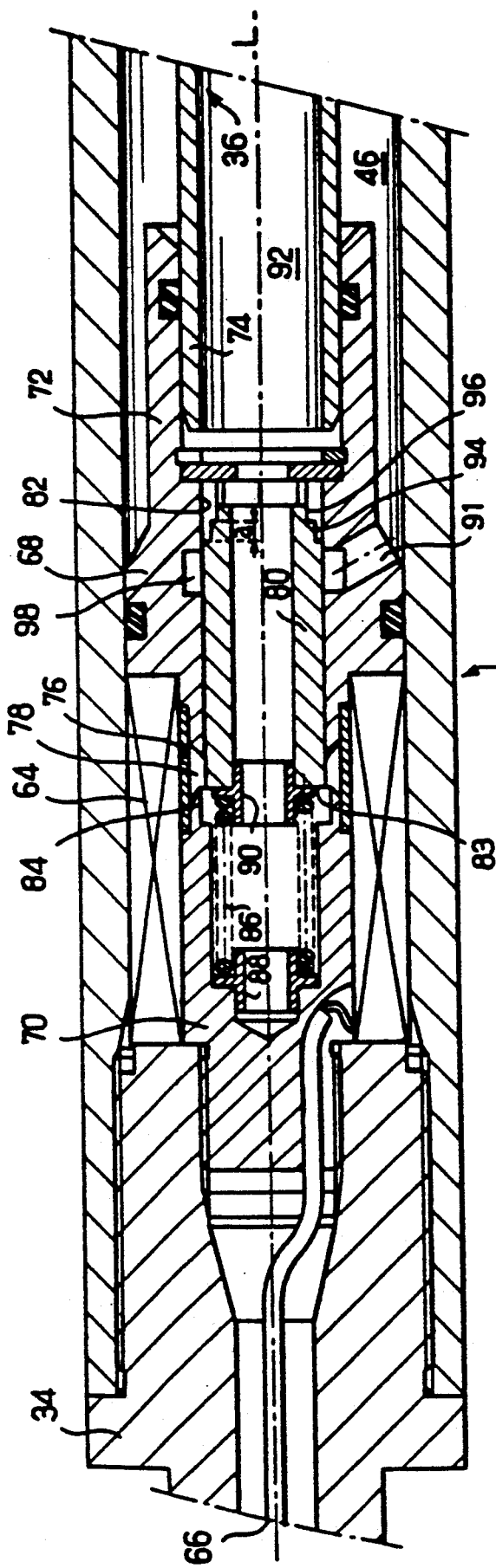
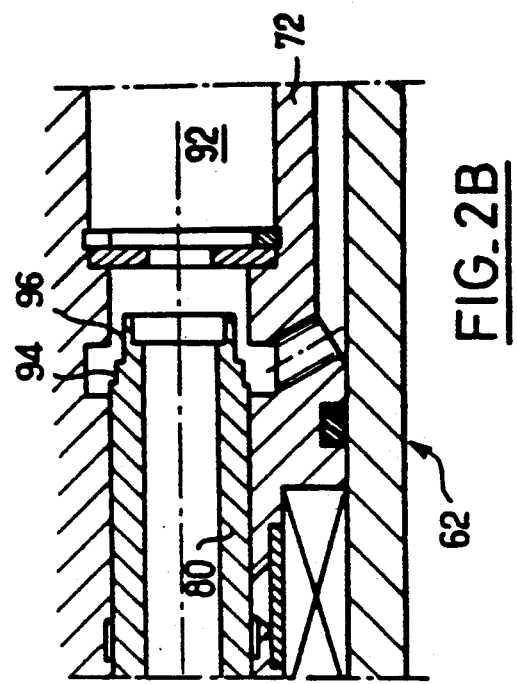
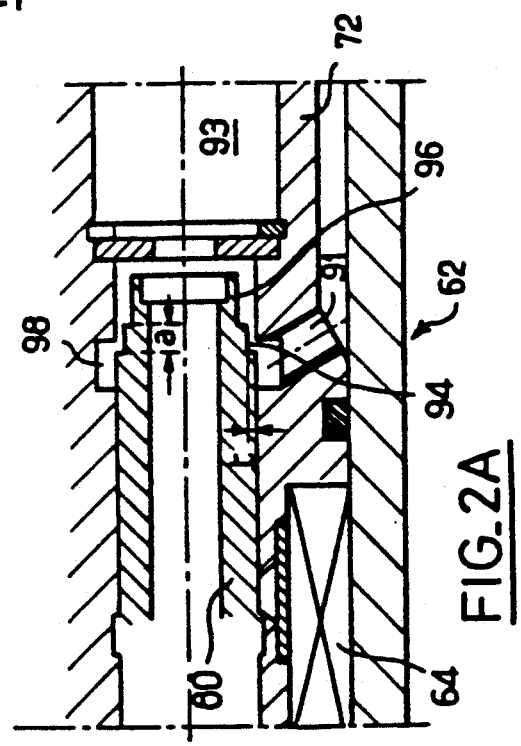
FIG. 2
FIG. 2B
FIG. 2A

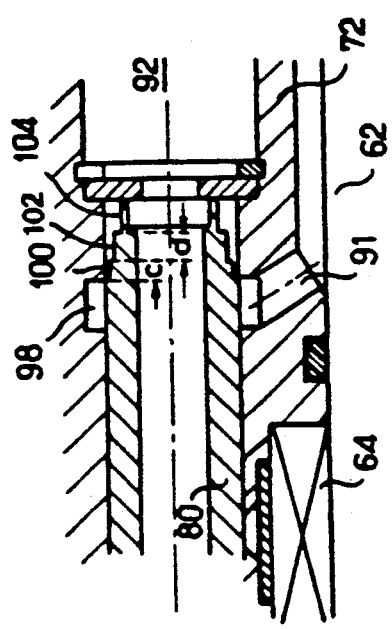
FIG_3
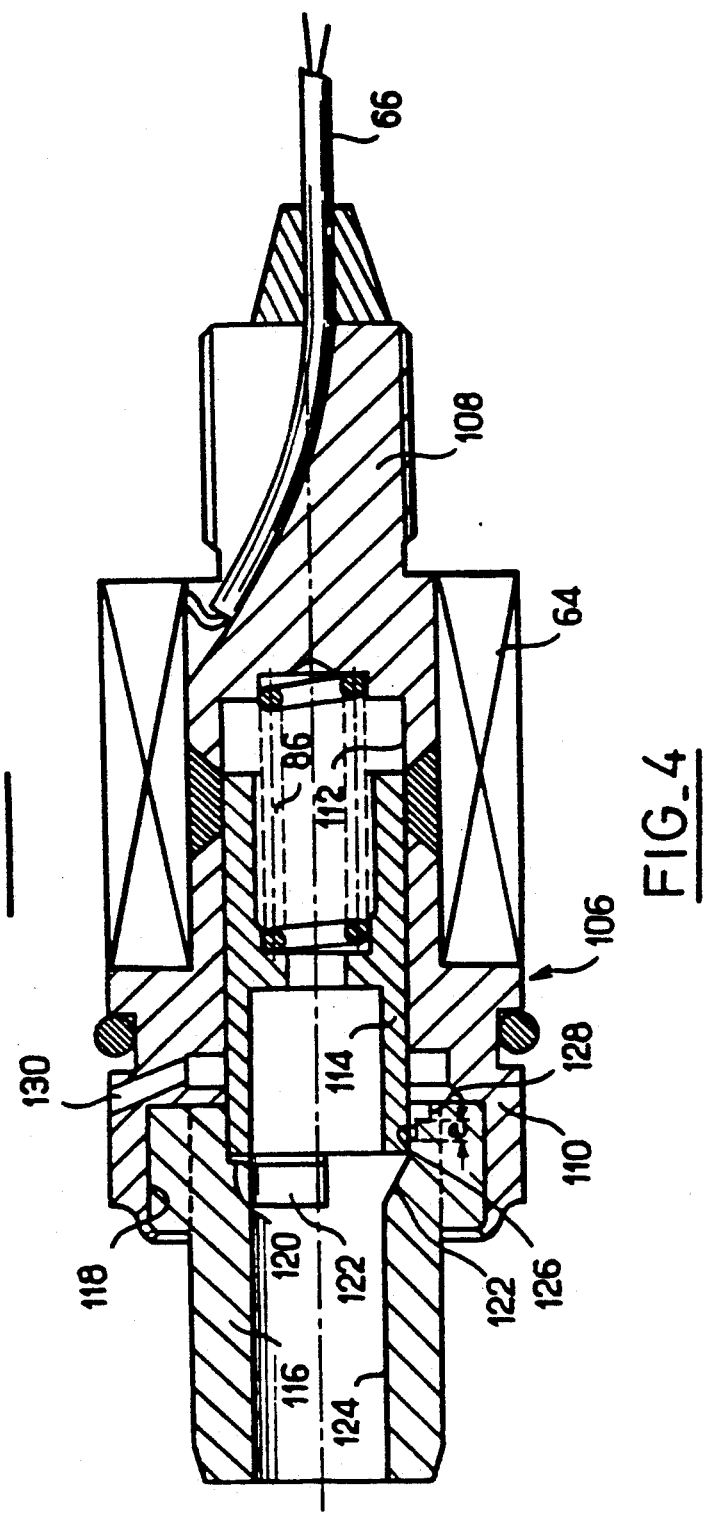
FIG_4

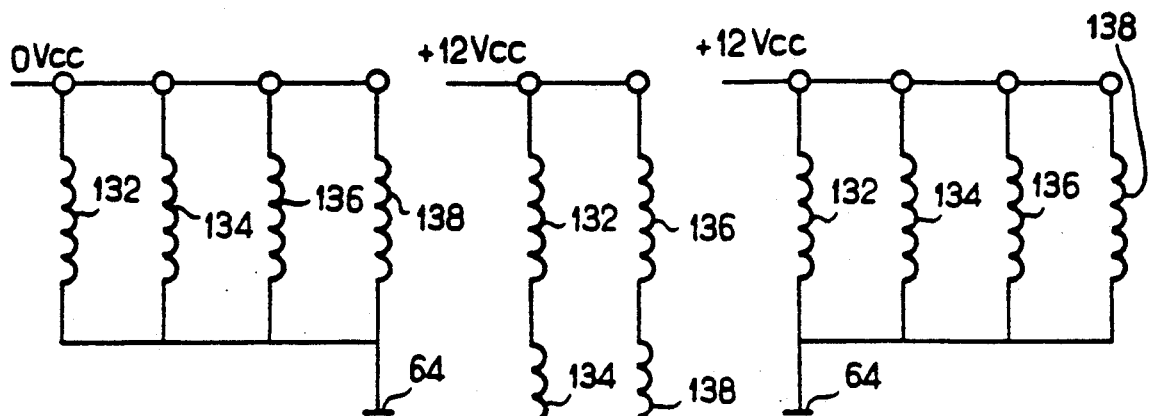
FIG.5  FIG.5A  FIG.5B
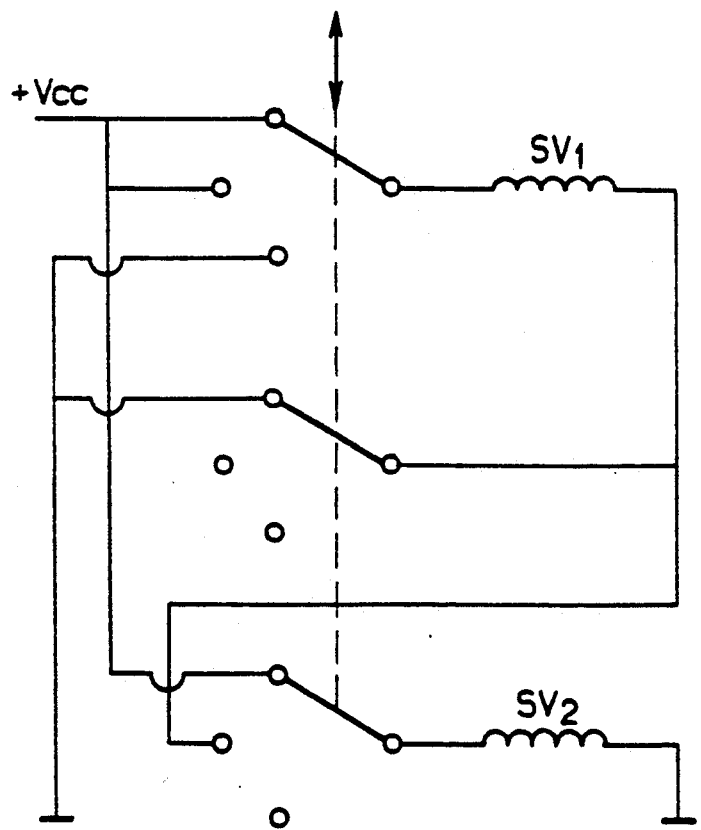
FIG.5D
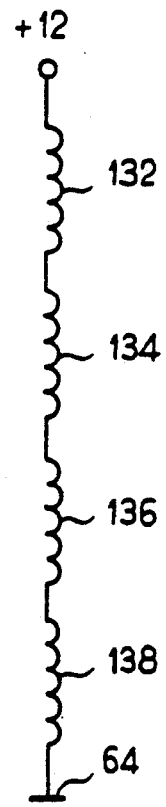
FIG.5C

VARIABLE RATE SHOCK ABSORBER

This is a continuation of abandoned Application Ser. No. 310,981 filed Feb. 14, 1989.

The present invention relates to a variable rate shock absorber and, more particularly, to electrically controlled variable rate shock absorbers for automotive vehicles.

In order to deal with varying road conditions it is desirable to be able to to be able to change the response characteristics, or rate of stiffness of a vehicle's shock absorbers which serve to provide hydraulic damping of the vehicle suspension.

Various types of electrically controlled variable rate shock absorbers have been previously proposed. For example U.S. Pat. No. 3,039,566 describes a hydraulic shock absorber in which a solenoid valve simultaneously vents the upper and lower working chambers to a reservoir, thus to selectively change the characteristics of the suspension. This arrangement had the disadvantage that the shock absorber structure was complex and that it needed special electrical control circuitry for the valve.

It is therefore an object of the present invention to provide a variable rate shock absorber of simple structure and in which the control circuitry for the valve is minimized.

According to the present invention there is provided a variable rate shock absorber comprising a tubular working cylinder destined to be mounted on a suspended part of a vehicle, a piston rod assembly slideably received in the working cylinder and having an end destined to be mounted on a fixed part of a vehicle, the piston rod assembly having at its free end a piston member cooperating with the working cylinder to divide the interior thereof into an upper and a lower working chamber, valve means in the piston member to permit controlled two-way flow between the upper and lower working chambers and electromagnetic valve means disposed between the upper working chamber and a reservoir and selectively actuatable to allow fluid flow therebetween, the valve means comprising a first member slideably mounted with respect to a second member between a closed position and an open position, characterized in that the first member is moveable into at least one partially open position, the position defined by at least one stepped valve surface formed on one member.

The invention will now be described by way of example with reference to the accompanying drawings, in which:

FIGS. 2,2A and 2B are detailed views of a part of FIG. 1 showing the electrovalve in various operating positions, and shown by reference numeral 2 in FIG. 1;

FIG. 3 is a detailed sectional view of a second embodiment of electrovalve in accordance with the invention;

FIG. 4 is a longitudinal section through a third embodiment of electrovalve; and FIG. 5 and 5A to 5D are diagrams of electric control circuits for the present shock absorber.

Figure 1:
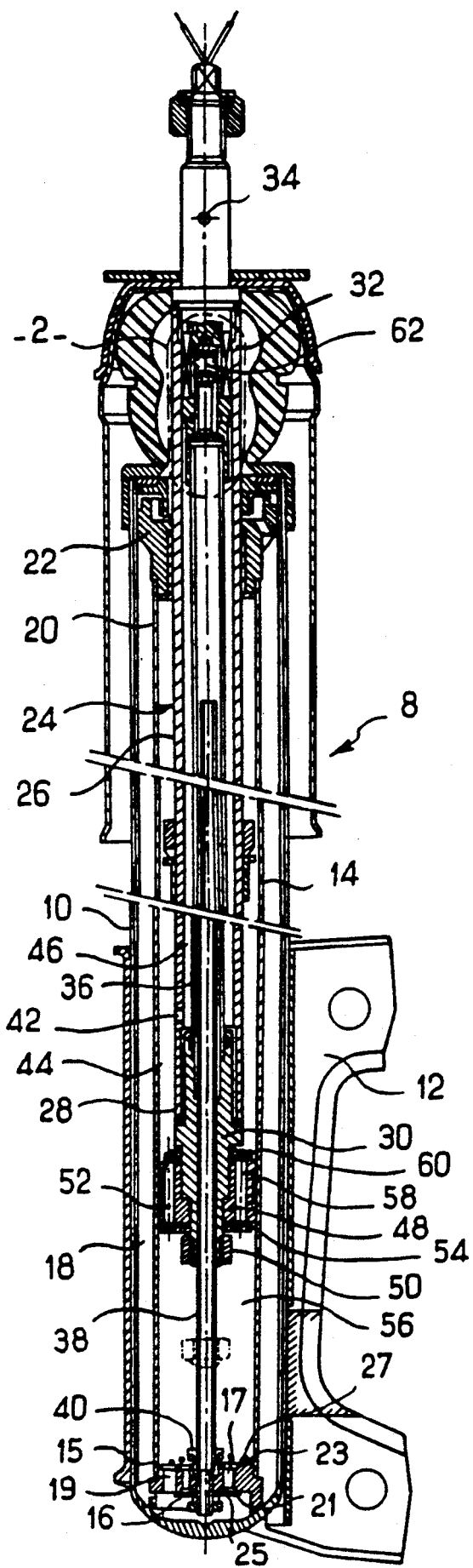
FIG. 1 is a longitudinal section through a shock absorber, in accordance with the invention.

As shown in FIG. 1, the variable rate shock absorber 8 which, in the example shown, is of the bi-tube type, comprises a cylindrical outer shell 10 to which is secured a bracket 12 by means of which the shell 10 may be mounted on a support for one of a vehicle's wheels (not shown). An inner cylinder 14 is fixedly mounted inside the shell 10 and is closed at one end 15 by a two way pressure relief valve member 16 which connects the interior of the inner cylinder 14 with an annular reservoir 18 formed between the inner cylinder 14 and the outer shell 10. The other end 20 of the inner cylinder 14 is closed relative to the outer shell 10 by a closure member 22.

The shock absorber further comprises a piston rod assembly 24 which is slideably received in the closure member 22 and extends within the inner cylinder 14, coaxially therewith. The piston rod assembly 24 comprises a tubular strut 26 in one end 28 of which is fitted a mounting member 30, the other end 32 of which being closed by a mounting bolt 34 whose free end is intended to be secured to the bodywork of the vehicle (not shown). The mounting member 30 also sealingly receives an end of a cylinder 36 and further receives, slidingly, a second cylindrical part 38 one end 40 of which is fixedly mounted in the valve member 16 and passes therethrough. The cylinder 36 and the cylindrical part 38 are free to slide in telescoping fashion one relative to the other. At least one aperture 42 is provided in the tubular strut 26 adjacent the mounting member 30 to provide fluid communication between the annular volume 44 defined within the inner cylinder 14 and the annular space 46 defined between the tubular strut 26 and the cylinder 36.

The mounting member 30 supports a piston member 48 which is slideably received within the inner cylinder 14. The piston member 48 is secured on the mounting member 30 by a nut 50 and has a set of through passages 52 which are open at one end and closed at the opposite end by a spring loaded valve 54 which allows one-way fluid flow between the annular volume 44 and a working chamber 56 formed at an end of the inner cylinder 14. The piston member 48 has a second set of through passages 58 which are open to the working chamber 56 and closed at their opposite end by a second spring loaded valve 60 to provide unidirectional flow from the lower working chamber 56 to the annular volume 44.

The valve member 16, mounted under pressure between the cylinder 14 and the outer shell 10, contains several passages 17 and 19 similar to those described in the piston, and which are closed by valves 21 and 23 under the effect of springs 25 and 27 respectively.

FIG. 2 shows details of a first embodiment of solenoid valve 62. As shown, the solenoid valve 62 comprises a solenoid coil 64 which is selectively connectable by an electric cable 66 to a controlling power source (not shown). The solenoid coil 64 is formed around a core member 68 one end of which is fixedly mounted on the mounting bolt 34 and the other end sealingly and slideably receives the free end 74 of cylinder 36. The core member 68 is formed from two parts of magnetic material 70 and 72 which are joined together by a ring 76 of non-magnetic material, for example bronze. An annular air gap 78 is defined between the opposing edges of the two parts 70 and 72 of the core member 68.

A cylindrical valve member 80 is slideably mounted in a longitudinal bore 82 formed in the core member 68 and has a length such that, in the illustrated rest position, an end 83 of the valve member 80 is immediately adjacent the leading edge 84 of part 70 of the core member 68. The valve member 80 is urged towards its illustrated rest position by a spring 86 which is located between two non-magnetic bushes 88 and 90 located within core part 70.

The core part 72 is formed with a through passage 91, one end of which opens into the annular space 46, and the other end of which is closed by the valve member 80 when in its rest postion. Opening of passage 91 by movement of the valve member 80 allows fluid to pass between the interior 92 of cylinder 36 and the annular space 46.

In use the annular volume 44 and the working chamber 56 are filled with a hydraulic fluid while the annular reservoir 18 is only partially filled with hydraulic fluid. The remaining portion of the annular reservoir 18 is filled with air or gas at a pressure above or equal to atmospheric pressure.

In accordance with the invention the valve member 80 is formed, at its end adjacent the opening 91 with first and second annular surfaces 94 and 96 of decreased diameter and each centered on the longitudinal axis L of the valve member. The diameter of second surface 96 which is at the end of valve member 80 is less than that of first surface 94. The annular surface 94 has an axial length of -a-. Passage 91 opens into an annular groove 98 which extends around the end of valve member 80.

In the illustrated rest position of the valve member 80, the end of the valve member extends beyond the annular groove 98 so that a portion of the valve member having its full diameter, which closely corresponds to that of bore 82, closes the fluid passage between the interior 92 of the cylinder 36 and passage 91.

Activation of the solenoid coil 64 to a given first level will cause the valve member 80 to be drawn back against the force of the spring 86 into a first position where the first annular surface 94 is located opposite the edge of annular groove 98. This position is shown in FIG. 2A. Such an opening will allow fluid passage at a rate proportional to the restriction defined between the edge of the annular groove 98 and the first surface 94. As the first surface 94 is of constant diameter it is immaterial which point along the axial length -a- is moved into position opposite the edge of the annular groove 98; the resulting restriction of thickness -t-, which is presented to fluid passage, will be the same. The previously discussed feature, which is in accordance with the invention, means that it is not necessary to position the valve member 80 with any great precision. Thus, as will be described below, the electric control circuit for the solenoid coil 64 can be minimized.

If the solenoid coil 64 is actuated to a second, higher level the valve member 80 will be drawn back further against the force of spring 86 into a second position in which the second surface 96 is located opposite opposite the end of annular groove 98. This position is shown in FIG. 2B and is considered as the open position of the valve member 80 where the restriction, and hence the pressure drop across it, are negligible.

FIG. 3 shows a second embodiment of the invention in which the valve member 80 is formed with first, second and third annular surfaces 100,102, and 104. The first and second annular surfaces 100 and 102 have similar axial lengths -c-and -d- which, as in the case of the previous embodiment, allow the valve member 80 to be positioned with any point along the annular surfaces 100 and 102 adjacent the edge of annular groove 98 to form a given restriction. The first and second annular surfaces 100 and 102 give two possible predetermined restrictions to fluid flow past the valve member 80. Displacement of the valve member 80 to a point where the third annular surface 104 is adjacent the edge of annular groove 98 forms the open position where the restriction, and hence the pressure drop across it, are negligible. Thus, with this embodiment, the valve member 80 can be selectively moved, with no great precision, into four different positions corresponding to different operating characteristics of the shock absorber. These four positions may be described as closed, first restriction, second restriction and open.

FIG. 4 shows a further embodiment of the invention which differs from those previously described in that the surfaces which define the restrictions are formed in the core member rather than on the valve member 80. In this embodiment the core member 106 is formed in three parts, first and second parts 108 and 110 which together define the bore 112 in which slides the valve member 114, and a third part 116. The third part 116 is generally tubular and is mounted by means of a screw thread 118 into an open end of the second core part 110. The third part 116 has a radial abutment surface 120 against which the valve member 114 is urged by spring 86. Three equally spaced chamfered fluid passages 122 are formed in the inner wall 124 of the third part 116, immediately adjacent the abutment surface 120. The chamfered passages 122 lead to first and second stepped surfaces 126 and 128 formed in the wall 124 of the third part 116. The first annular surface 126 has an axial length -e-. FIG. 4 shows the rest position of the valve in which the valve member 114 is urged by spring 86 into abutment against radial surface 120. In this position the valve member 114 closes the fluid passage between the interior of the third part 116, which communicates with cylinder 36 not shown, and an outlet passage 130 which opens into annular space 46 (not shown). When the solenoid coil 64 is actuated to a first level the valve member 114 is drawn back to a first position where the end of the valve member is adjacent a point on first stepped surface 126. This allows a first restricted fluid passage between the interior of cylinder 36 and annular space 46. Actuation of the solenoid coil 64 to a higher level causes the valve member 114 to be drawn back further against spring 86 so that the end is adjacent a point on the second stepped surface 128. This forms the open position of the valve in which the restriction is negligible. As with the previous embodiments it will be seen that it is not necessary to position the valve member 114 with great precision. It would, of course, be possible to form the third part 116 with first, second and third stepped surfaces in order to provide operating characteristics similar to those of the embodiment of FIG. 3.

In FIGS. 5,5A and 5B are shown possible electrical control circuits for the above described embodiments. FIG. 5 shows the circuit corresponding to the closed position of the valve member in which a zero voltage is applied to the solenoid coil 64. In FIG. 5A four resistances 132,134,136 and 138 are arranged in two parallel pairs and a positive continuous voltage, 12 volts in the example shown, is applied across the resistances to the solenoid coil 64. It is envisaged that the four resistances be of substantially similar impedance. The coil intensity, I, in this situation, which corresponds to an intermediate open position of the valve member is represented by the formula $$I = \frac{V}{2R}$$

where V is the applied voltage and R is the coil resistance. The applied voltage would, in use, come from the vehicle battery and any variation in this voltage would simply cause the valve member to be displaced slightly relative to its mean intermediate position.

Any such minor displacement of the valve member would not affect the restriction, due to the previously described length of the first surface 904,100 or 126.

FIG. 5B shows the circuit which produces the open position of the valve member. In this circuit the four resistances 132,134,136 and 138 are arranged in parallel and a positive continuous voltage is applied across them. In this circuit the coil intensity I is defined as $$I = \frac{V}{R}$$

where V is the applied voltage and R is the coil resistance. In this case the valve of I is twice that of FIG. 5A. FIG. 5C shows the circuit necessary to produce a second intermediate position of the valve member such as that used in the embodiment of FIG. 3. In this case the four resistances 132,134,136,138 are arranged in series. In this case the coil intensity $$I = \frac{V}{4R}$$

Finally FIG. 5D shows an example of an electrical switching circuit which could be used to produce the resistance arrangements of the previous figures.

Thus, it will be seen that the valve arrangement of the present invention allows the production of a variable rate shock absorber whose construction is simple and whose cost is relatively low. The electrical control circuit associated with the shock absorber is also simple and of low cost.

The invention has been described with reference to a shock absorber of the bi-tube type. It is of course possible to easily adapt the valve assembly for use in a shock absorber of the mono-tube type. Furthermore, it is envisaged that the valve assembly may be provided in a fluid passage at another point in the shock absorber for example in a chamber located below the relief valve member 16 or at the free end of the piston assembly 24. In any embodiment it is simply necessary to locate the valve member in the fluid passage between the upper working chamber and a fluid reservoir formed in the shock absorber.

It is further envisaged the valve member 80 may be slideably mounted around the outside of an inner core member.

Thus, with the present invention, it is possible to provide satisfactory modification of the suspension characteristics to meet the essential motoring needs with the minimum of components.

I claim:

1. A variable rate shock absorber comprising a tubular working cylinder destined to be mounted on a suspended part of a vehicle, a piston rod assembly received slideably in the working cylinder and having a first end destined to be mounted on a fixed part of the vehicle, the piston rod assembly having at a free end a piston member cooperating with the working cylinder to divide the interior thereof into an upper and a lower working chamber, valve means in the piston member to permit controlled two-way flow between the upper and lower working chambers and electromagnetic valve means disposed between the upper working chamber and a reservoir and selectively actuatable to allow fluid flow therebetween, the electromagnetic valve means comprising a first member mounted slideably with respect to a second member between a closed position and an open position, characterized in that the electromagnetic valve means further comprises a core member formed of two parts separated from one another by a non-magnetic part in order to define a separation between the two parts, the first member moveable into at least one partially open position, the partially open position defined by at least one stepped valve surface having an axial length and located on one of said members, the first member being generally cylindrical and mounted in a cylindrical bore in the second member, the valve surface being generally annular and of constant diameter, the closed position being effected by the first member moving slideably past a flow opening at the second member so that sliding engagement of parallel surfaces of the first and second members closes flow through the flow opening, the partially open position effected at any point along said axial length of the valve surface, such that the partially open position is effected by non-precision applying of a voltage to the electromagnetic valve means to effect non-precision positioning of the first member relative to the second member.

2. The shock absorber as claimed in claim 1, characterized in that the valve surface is on the first member, the first member being slideable relative to the flow opening formed in the second member and which forms part of a fluid passage between the upper working chamber and the reservoir, an intermediate position being defined between the opening and the valve surface.

3. The shock absorber as claimed in claim 2, characterized in that the first member further comprises a second stepped valve surface corresponding to a fully open position of the electromagnetic valve means.

4. The shock absorber as claimed in claim 3, characterized in that the first member comprises a third stepped valve surface corresponding to a second partially open position.

5. The shock absorber as claimed in claim 1, characterized in that the valve surface is on the second member.

6. The shock absorber as claimed in claim 5, characterized in that the first member is partially received in the bore in the second member, the valve surface forming a part of the wall of said bore.

7. The shock absorber as claimed in claim 6, characterized in that the second member comprises a second stepped valve surface corresponding to a fully open position of the valve means.

8. The shock absorber as claimed in claim 1, characterized in that the reservoir is constituted by the lower working chamber.

9. The shock absorber as claimed in claim 1, characterized in that the electromagnetic valve means is located in the piston rod assembly between the first end and the piston member.

10. The shock absorber as claimed in claim 1, characterized in that the absorber further comprises control circuit means for the electromagnetic valve means, the circuit means comprising four resistances which are selectively arrangeable in one of parallel, series, and two parallel pairs.

* * * * *